United States Patent
Phlegm et al.

(10) Patent No.: US 9,573,484 B2
(45) Date of Patent: Feb. 21, 2017

(54) SYSTEMS AND METHODS FOR DETERMINING BATTERY STATE INFORMATION BASED ON INTERNAL BATTERY PRESSURE

(71) Applicant: GM GLOBAL TECHNOLOGY OPERATIONS LLC, Detroit, MI (US)

(72) Inventors: Herman K. Phlegm, Oak Park, MI (US); Andrew J. Namou, West Bloomfield, MI (US); Edgar P. Calderon, Sterling Heights, MI (US); Lisa J. Gross, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 233 days.

(21) Appl. No.: 14/163,584

(22) Filed: Jan. 24, 2014

(65) Prior Publication Data

US 2015/0210182 A1    Jul. 30, 2015

(51) Int. Cl.
*H01M 10/48* (2006.01)
*H01M 2/02* (2006.01)
*B60L 11/18* (2006.01)

(52) U.S. Cl.
CPC ........ *B60L 11/1862* (2013.01); *B60L 11/1857* (2013.01); *H01M 2/02* (2013.01); *H01M 10/48* (2013.01)

(58) Field of Classification Search
CPC .... H01M 2/206; H01M 2/1072; H01M 10/48; H01M 16/00; B60L 11/1809; B60L 3/04; B60L 11/1862; B60L 11/1857
See application file for complete search history.

(56) References Cited

U.S. PATENT DOCUMENTS

| | | | | |
|---|---|---|---|---|
| 4,080,560 A | * | 3/1978 | Abert | H01M 10/48 320/134 |
| 4,723,087 A | * | 2/1988 | Fox | F42C 11/02 310/329 |
| 5,536,245 A | * | 7/1996 | Dahlbeck | A61B 1/267 600/195 |
| 2009/0053586 A1 | * | 2/2009 | Fredriksson | H01M 2/08 429/57 |
| 2010/0026609 A1 | * | 2/2010 | Otsuki | H01M 10/48 345/8 |
| 2010/0133030 A1 | * | 6/2010 | Johnson | B60K 1/04 180/68.5 |
| 2011/0076530 A1 | * | 3/2011 | Miyamoto | H01M 10/4207 429/61 |
| 2012/0280692 A1 | * | 11/2012 | Park | H01M 2/206 324/426 |

* cited by examiner

*Primary Examiner* — Kenneth Douyette
(74) *Attorney, Agent, or Firm* — Phillips Ryther & Winchester; John P. Davis

(57) ABSTRACT

Systems and methods for monitoring a state of a battery system based on information related to a measured pressure within the battery system are presented. In certain embodiments, the disclosed systems and methods may utilize a pressure-sensitive smart foam material in connection with measuring a pressure within the battery system. Based on the measured pressure information, a variety of information relating to the battery system may be determined. For example, information relating to a state of a battery system, certain events occurring within the battery system, and/or battery lifecycle information may be determined based on the measured pressure information.

9 Claims, 9 Drawing Sheets

SYSTEMS AND METHODS FOR DETERMINING BATTERY STATE INFORMATION BASED ON INTERNAL BATTERY PRESSURE

TECHNICAL FIELD

This disclosure relates to systems and methods for determining a state of a battery system. More specifically, the systems and methods of the present disclosure relate to determining a state of a battery system based on pressure information measured using a pressure-sensitive material disposed proximate to the battery system.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system (e.g., a 360V HV battery system) may be used to power electric drivetrain components of the vehicle (e.g., electric drive motors and the like). For example, an HV rechargeable energy storage system ("RESS") included in a vehicle may be used to power electric drivetrain components of the vehicle.

Due to vehicle impact events (e.g., vehicle collisions), certain electronics configured to control and/or monitor battery operations in a vehicle may be damaged and/or limited in their ability to detect certain battery state information. For example, electronic communication and/or power lines may become damaged and/or disconnected in a vehicle collision, thereby limiting the functionality of associated battery monitoring electronics. Moreover, conventional battery monitoring systems may be limited in their ability to utilize information associated within an internal pressure of a battery system in connection with determining state information of the battery system (e.g., battery system state of health ("SOH") and/or other battery system performance information, information regarding compromised and/or damaged battery cells, etc.).

SUMMARY

Systems and methods are presented for monitoring a state of a battery system based, at least in part, on information related to a measured pressure within the battery system. In certain embodiments, the disclosed systems and methods may utilize a pressure-sensitive material in connection with measuring a pressure within the battery system that, in some instances, may be referred to herein as a smart foam material. Based on the measured pressure information, a variety of information relating to the battery system may be determined. For example, information relating to a state of a battery system (e.g., a SOH of the battery system), certain events occurring within the battery system (e.g., thermal and/or venting events, damaged and/or compromised battery cells, etc.), and/or battery lifecycle information (e.g., battery end-of-life ("EOL") information) may be determined based, at least in part, on the measured pressure information.

In certain embodiments, a method for determining a state of a battery system included in a vehicle may include receiving a voltage signal from a pressure-sensitive material located proximate to a component of the battery system (e.g., a battery cell or the like). In some embodiments, the voltage signal may be related to a pressure applied to the pressure-sensitive material by the battery system component (e.g., by expansion of the battery system component). The received voltage signal may be compared with a threshold voltage signal. Based on the results of the comparison, a state of the battery system may be determined, and a protective action associated with the state may be implemented.

In further embodiments, a system for determining a state of a battery system included in a vehicle may include a pressure-sensitive material located proximate to a component of the battery system (e.g., a battery cell or the like). In certain embodiments, the pressure-sensitive material may comprise a piezoelectric film applied to at least one side of a substrate. In some embodiments, the piezoelectric film may comprise a polyvinylidine film and the substrate may comprise a polyurethane substrate.

The system may further include a battery monitoring system communicatively coupled to the pressure-sensitive material. The battery monitoring system may receive a voltage signal from the pressure-sensitive material related to a pressure applied to the pressure-sensitive material by the battery system component, compare the received voltage signal with a threshold voltage signal, determine a battery system state based on the comparison, and implement at least one protective action based on the same. In some embodiments, the battery monitoring system may be integrated and powered internally by the battery system. In further embodiments, the battery monitoring system may be powered by a power source external to the battery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
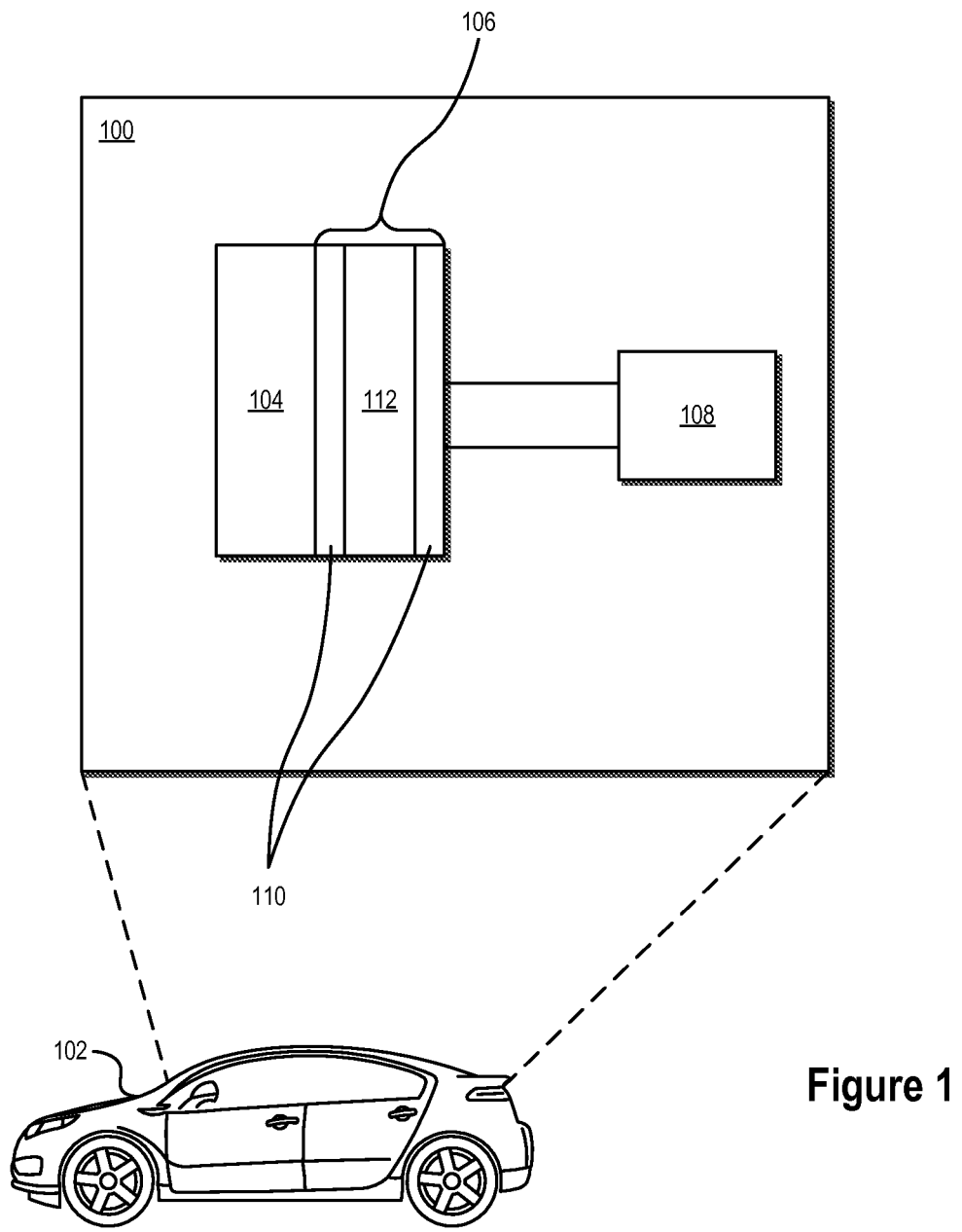
FIG. 1 illustrates an exemplary system for measuring a pressure associated with a battery system in a vehicle consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Systems and methods disclosed herein allow for monitoring a state of a battery system based, at least in part, on information related to a measured pressure within the battery system. In certain embodiments, the disclosed systems and methods may utilize a pressure-sensitive smart foam material in connection with measuring a pressure within the battery system. The pressure-sensitive smart foam material may accumulate a measurable electric charge when a mechanical stress (e.g., pressure) is applied to the material, thereby generating a measurable voltage related to an amount of pressure applied to the material.

In some embodiments, the pressure-sensitive smart foam material may be disposed proximate to the battery system and/or a component thereof (e.g., a battery cell or the like). For example, in some embodiments, the pressure-sensitive smart foam material may be integrated internally into a battery system and/or a component thereof (e.g., a battery cell) and be configured to measure an associated pressure (e.g., a pressure exerted by a battery cell or the like). In further embodiments, the pressure-sensitive smart foam material may be integrated external to a battery system and/or a component thereof in a structure configured to retain the battery system and/or its components. In yet further embodiments, the smart foam material may be integrated into a battery pouch configured to retain one or more cells and/or modules of a battery system. The smart foam material may be utilized to measure a pressure exerted by the battery system and/or a component thereof in connection with a pressure measurement system (e.g., a battery control and/or monitoring system or the like) configured to determine a pressure associated with a voltage output by the pressure-sensitive smart foam material in response to applied pressure.

FIG. 1 illustrates an exemplary system 100 for measuring a pressure associated with a battery system in a vehicle 102 consistent with embodiments disclosed herein. The vehicle 102 may be a motor vehicle, a marine vehicle, an aircraft, and/or any other type of vehicle, and may include an internal combustion engine ("ICE"), an electric motor drivetrain, a hybrid engine drivetrain, an FC drivetrain, and/or any other type of drivetrain suitable for incorporating the systems and methods disclosed herein. Although illustrated and described herein in reference to a battery system included in a vehicle 102, it will be appreciated that further embodiments may be implemented in connection with a variety of other battery systems, including battery systems that are not included in a vehicle.

The vehicle 102 may include a battery system that, in certain embodiments, may be a rechargeable HV battery system. The battery system may be used to power electric drivetrain components (e.g., as in an electric or hybrid power system). In further embodiments, the battery system may be a low voltage battery (e.g., a lead-acid 12V automotive battery) and may be configured to supply electric energy to a variety of vehicle 102 systems including, for example, vehicle starter systems (e.g., a starter motor), lighting systems, ignition systems, and/or the like.

The battery system may include one or more packs and/or modules suitably sized to provide electrical power to the vehicle 102. Each pack and/or module may include one or more battery cells 104 utilizing any suitable battery technology or combination thereof. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies.

A pressure-sensitive material 106 may be disposed proximate to the battery cell 104 and/or any other component of the battery system. In some embodiments, the pressure-sensitive material 106 may be utilized to measure a pressure exerted on the material 106 by the battery cell 104. In certain embodiments, when pressure and/or any other mechanical stress is applied to the material 106, a measurable electric charge may accumulate in the material 106 (e.g., via a piezoelectric effect), thereby generating a measurable voltage related to an amount of pressure applied to the material 106. This voltage may be measured by a battery monitoring system 108 and used by the monitoring system 108 in connection with determining an amount of pressure (e.g., a pressure in Kpa) applied to the material 106 (e.g., pressure applied by the battery cell 104).

Consistent with embodiments disclosed herein, the pressure-sensitive material 106 may comprise a pressure-sensitive smart foam material. In some embodiments, the smart foam material may comprise a polyvinylidine film 110 ("PVDF") bonded to one or both sides of a substrate 112 that, in certain embodiments, may comprise a polyurethane material. The PVDF 110 may function as a tactile sensor array and the polyurethane substrate may function as a pressure substrate. In certain embodiments, the PVDF 110 may generate approximately −33 pC/N when pressure is applied. Although illustrated as having two PVDF layers 110 each bonded to a side of the substrate 112, it will be appreciated that in other embodiments, any suitable number of layers of PVDF 110 and/or substrate material 112 may also be utilized in any suitable configuration.

As discussed above, the battery monitoring system 108 may be configured to measure a voltage generated by the pressure-sensitive material 106 in response to applied mechanical stress and/or pressure. Based on the measured voltage, associated pressure information may be determined by the battery monitoring system 108 using, for example, a known relationship between a pressure applied to the pressure-sensitive material 106 and a corresponding measurable voltage. The battery monitoring system 108 may utilize the measured pressure information in connection with determining a variety of information relating to the battery system associated with certain pressure conditions. For example, information relating to a state of a battery system (e.g., a SOH of the battery system), certain events occurring within the battery system (e.g., thermal and/or venting events, damaged and/or compromised battery cells, etc.), and/or battery lifecycle information may be determined based, at least in part, on the measured pressure information. In further embodiments, the battery monitoring system 108 may be configured to perform a variety of other operations in connection with monitoring and/or controlling the battery system including, without limitation, monitoring and controlling charging and discharging operations of the battery system.

In certain embodiments, the monitoring system 108 may be communicatively coupled with one or more others sensors (e.g., voltage sensors, current sensors, and/or the like, etc.) and/or other systems configured to enable the monitoring system 108 to monitor and control certain operations of the battery system. For example, one or more sensors may provide the monitoring system 108 with information used to estimate a state-of-charge ("SOC"), estimate a resistance, measure a current, and/or measure voltage of the battery system and/or its constituent components. The monitoring system 108 may further be configured to provide information to and/or receive information from other systems included in the vehicle 102. For example, the battery monitoring system 108 may be communicatively coupled with an internal vehicle computer system (not shown) and/or an external computer system (not shown).

In certain embodiments, the monitoring system 108 may be configured, at least in part, to communicate information regarding the battery system to a user of the vehicle 102, a vehicle computer system, and/or an external computer system. Such information may include, for example, internal battery pressure information, compromised and/or damaged battery cell information, battery EOL information, and/or any other information regarding the battery system.

In some embodiments, the battery monitoring system 108 may be configured to implement one or more protective actions based on measured battery system pressure information (e.g., based on pressure information exceeding one or more thresholds). In some embodiments, the protective actions may include providing a notification of battery system SOH, EOL, and/or other performance information (e.g., to a user of a vehicle, another interested party, and/or another vehicle system), information regarding compromised and/or damaged battery cells, and/or the like. For example, as a battery cell ages, the battery cell may expand over time, thereby exerting mechanical stress on the pressure-sensitive material 106. With certain exemplary battery cells, a cell may expand up to approximately 4% larger of its original size when it reaches its EOL. Upon measuring a voltage generated by the pressure-sensitive material 106 associated with a particular estimated battery cell age (e.g., an EOL condition associated with a pressure measurement of approximately 110 Kpa), the battery monitoring system 108 may provide a notification and/or other information to a user of the vehicle 100 and/or another interested party (e.g., a vehicle manufacturer and/or technician) of the estimated battery cell age and/or other battery system EOL information. Such notification and/or information may be utilized in connection with making battery EOL repair, replacement, and/or refurbishing decisions.

In another example, the battery monitoring system 108 may be powered by a low voltage internal battery system pack circuit and may monitor battery cell pressure of one or more target battery cells (e.g., battery cell 104). An output of the battery monitoring system 108 providing an indication of battery cell pressure may provide a low voltage safety output line that may be communicated external to the battery system as an indicator of battery SOH and may be utilized in a variety of applications including battery system discharge in connection with impact events.

Embodiments disclosed herein may also be used in connection with low battery pressure monitoring and/or a monitoring for an undesirable loss of a vacuum within a certain portion of a battery system. For example, the pressure-sensitive material 106 and/or the battery monitoring system 108 may be utilized to identify a low-pressure condition within the battery system and/or an associated portion thereof (e.g., a measured pressure falling below one or more thresholds) and implement one or more protective actions in connection with the same. In yet further embodiments, runaway and/or thermal events may be identified when a measured pressure deviates from an expected EOL pressure (e.g., by a delta of 200 Kpa), thereby providing an early indication of a malfunction during pack discharge events and providing an opportunity to implement one or more protective actions mitigating the same.

In addition to providing a notification to a user of a particular battery condition based on associated pressure information, further exemplary protective actions include, without limitation, venting a battery system, disconnecting a battery system from an HV bus or the like, and/or any other action associated with mitigating an undesirable battery condition that may be identified based on pressure information measured by the pressure-sensitive material 106 and/or the battery monitoring system 108.

Figure 2:
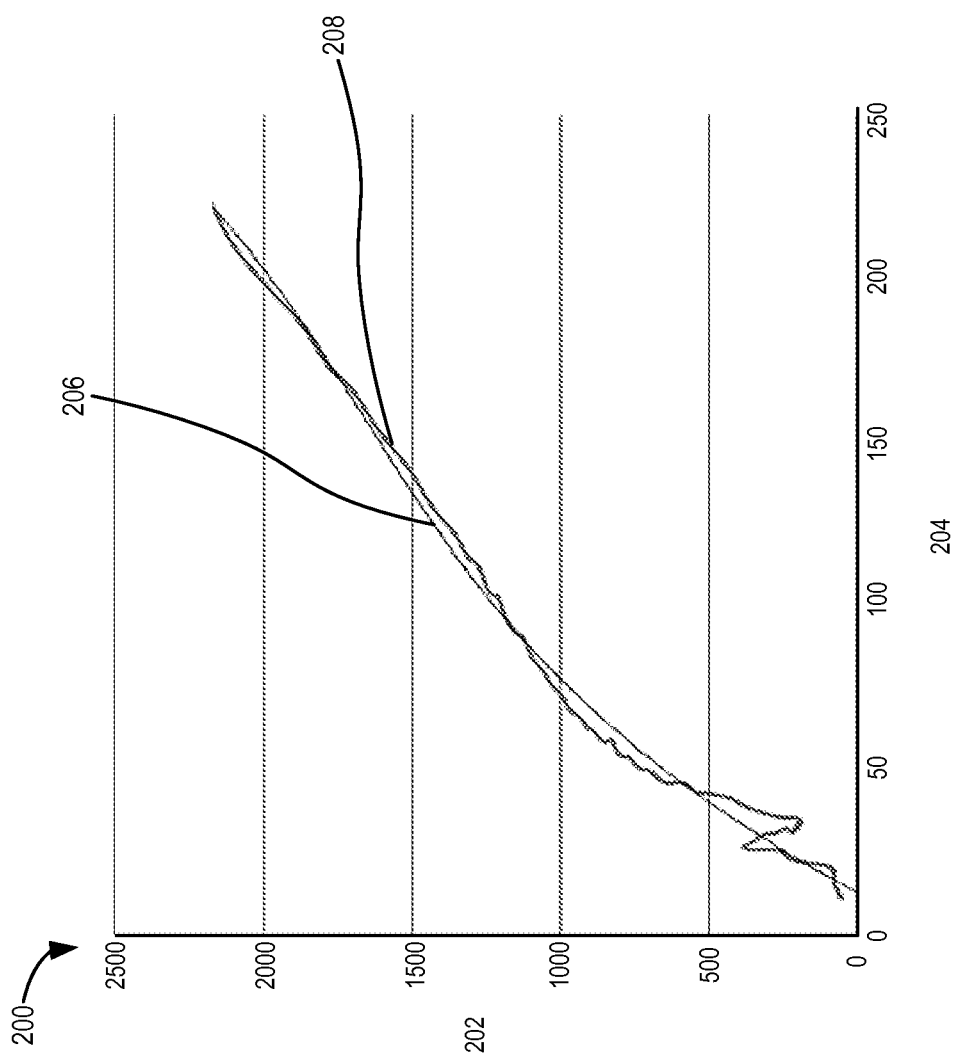
FIG. 2 illustrates a graph showing an exemplary measured output voltage of a pressure-sensitive material and associated measured pressures consistent with embodiments disclosed herein.

FIG. 2 illustrates a graph 200 showing an exemplary measured output voltage 202 of a pressure-sensitive material and associated pressures 204 consistent with embodiments disclosed herein. Particularly, information included in the graph 200 may be utilized in connection with determining a pressure 204 applied to a pressure-sensitive material associated with a particular measured output voltage 202 by, for example, a battery monitoring system and/or any other suitable system. In certain embodiments, the pressure-voltage relationship information included in the graph 200 may be associated with a pressure-sensitive smart foam material comprising one or more PVDF layers bonded to a polyurethane substrate as discussed above. Curve 206 illustrates an exemplary modeled pressure-voltage relationship and curve 208 illustrates an actual and/or measured pressure-voltage relationship of a pressure-sensitive smart foam material consistent with embodiments disclosed herein.

Figure 3:
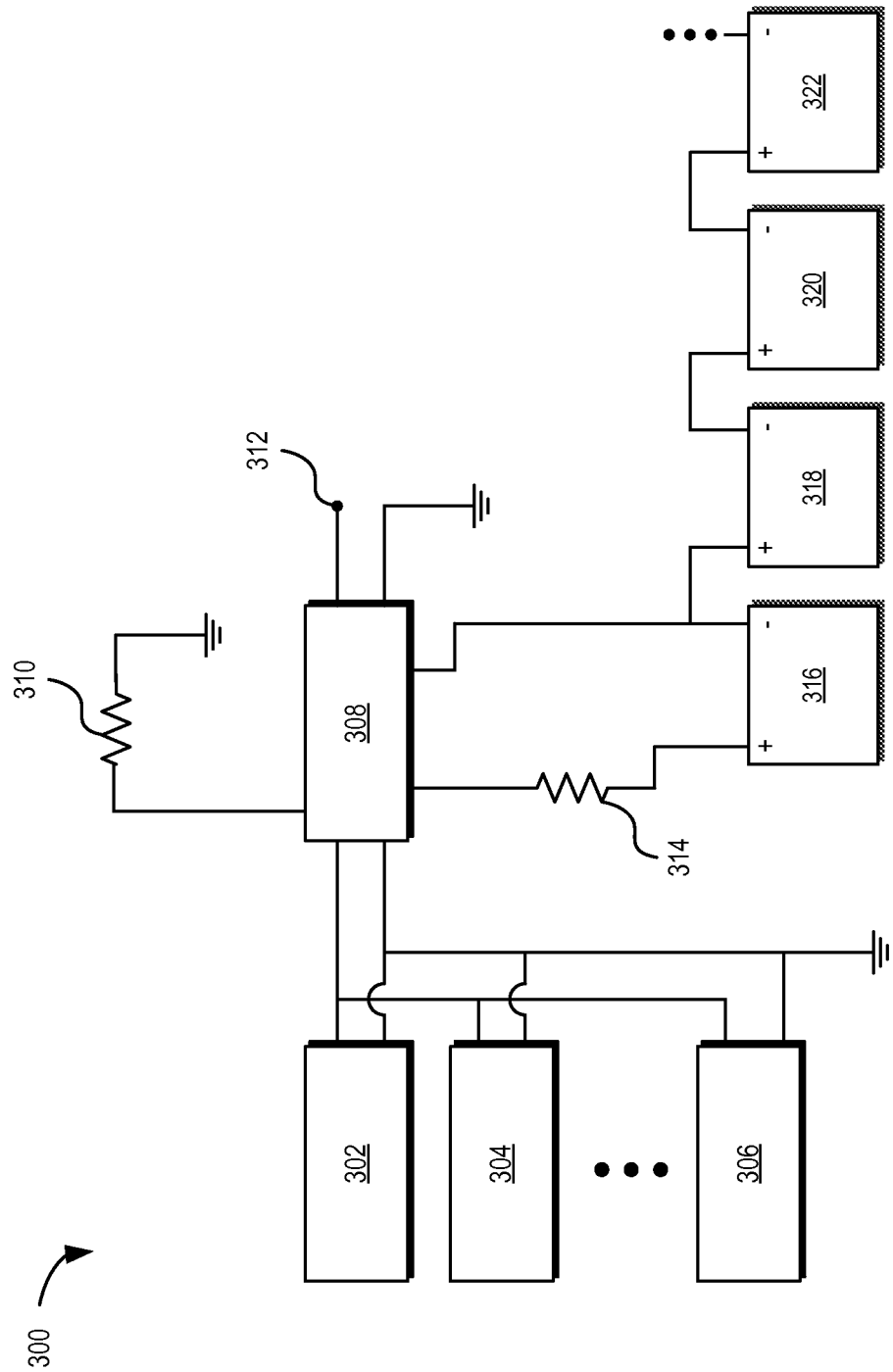
FIG. 3 illustrates a diagram of an exemplary system for measuring a pressure associated with a battery system consistent with embodiments disclosed herein.

FIG. 3 illustrates a diagram of an exemplary system 300 for measuring a pressure associated with a battery system consistent with embodiments disclosed herein. Particularly, the illustrated system 300 may be utilized in connection with measuring a pressure using one or more pressure-sensitive materials 302-306 disposed proximate to one or more battery cells 316-322 of a battery system. In certain embodiments, the pressure-sensitive materials 302-306 may be integrated into a battery cell and/or pouch design, allowing the material to protect battery cells 316-322 and/or other battery system component(s). In further embodiments, the geometry of the illustrated system 300 may allow for integration inside a battery pack cell/module.

As illustrated, the one or more pressure-sensitive materials 302-306 may configured to output a voltage related to a pressure exerted thereon to a coupled monostable multi-vibrator module 308. In some embodiments, the monostable multivibrator module 308 and/or associated components may be included as part of a battery monitoring system, as discussed above. The monostable multi-vibrator module 308 may be coupled to and/or powered by one or more of the battery cells 316-322 (e.g., via an isolation resistor 314). In this manner, the monostable multivibrator module 308 may be powered internally by a battery system, pack, and/or module, thereby providing an isolated secondary system for determining battery SOH and/or other battery conditions (e.g., during pack discharge following an impact event where certain other battery monitoring and/or control systems may be disconnected from the battery cells 316-322).

Based on voltages output by the one or more pressure-sensitive materials 302-306, the monostable multivibrator module 308 may be utilized in connection with determining information relating to a pressure exerted on the one or more pressure-sensitive materials 302-306 according to a known pressure-voltage relationship such as that illustrated and described above in connection with FIG. 2. The monostable multivibrator module 308 may output a pressure indication signal 312 providing an indication of a determined pressure.

In certain embodiments, the pressure indication signal 312 may be a binary signal indicating whether one or more threshold voltage signals associated with one or more pressure thresholds has been crossed by the one or more voltages received from the one or more pressure-sensitive materials 302-306 (i.e., whether a pressure measured by the materials 302-306 exceeds or falls below one or more pressure thresholds). In some embodiments, the monostable multivibrator module 308 may output an asserted pressure indication signal 312 (e.g., a binary high state) when the one or more threshold voltage signals are exceeded by the one or more voltages received from the one or more pressure-sensitive materials 302-306, and may output an un-asserted pressure indication signal 312 (e.g., a binary low state) when the one or more threshold voltage signals are not exceeded by the one or more voltages received from the one or more pressure-sensitive materials 302-306. It will be appreciated that a variety of suitable pressure indication signals may be utilized in connection with providing an indication of a determined pressure, including signals having a different binary behavior than that described above.

In some embodiments, the one or more pressure thresholds may be tunable and/or modified. For example, one or more tunable resistors 210 may be utilized to adjust the one or more threshold voltage signals used in connection with generating the pressure indication signal 312. In this manner, the monostable multivibrator module 308 may be tuned based on associated pressure-sensitive materials 306-306 and/or battery cells 316-322 being monitored. Based on the pressure indication signal 312, one or more actions may be taken by one or more systems monitoring and/or controlling certain operations of battery cells 316-322 and/or an associated vehicle including, for example, notifying a user and/or other interested party of a pressure threshold being exceeded and/or implementing one or more other protective actions.

Figure 4:
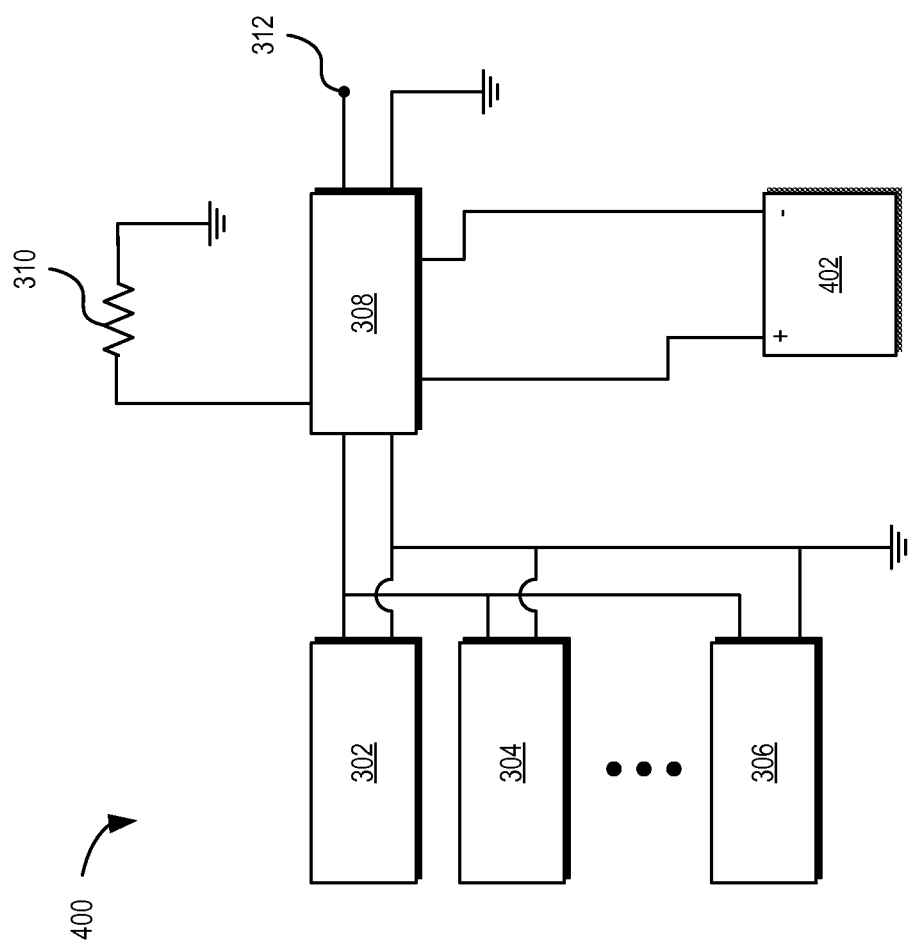
FIG. 4 illustrates diagram of another exemplary system for measuring a pressure associated with a battery system consistent with embodiments disclosed herein.

FIG. 4 illustrates diagram of another exemplary system 400 for measuring a pressure associated with a battery system consistent with embodiments disclosed herein. Certain elements of the exemplary system 400 may be similar to those illustrated in and described in reference to FIG. 3 and, accordingly, similar elements may be denoted with like numerals. In some embodiments, the monostable multivibrator module 308 of system 400 may be coupled to and/or powered by an external power source 402 (e.g., an external low voltage battery or the like). In this manner, certain embodiments of the exemplary system 400 may be implemented without substantial internal integration in an associated battery system, pack, and/or module.

Figure 5:
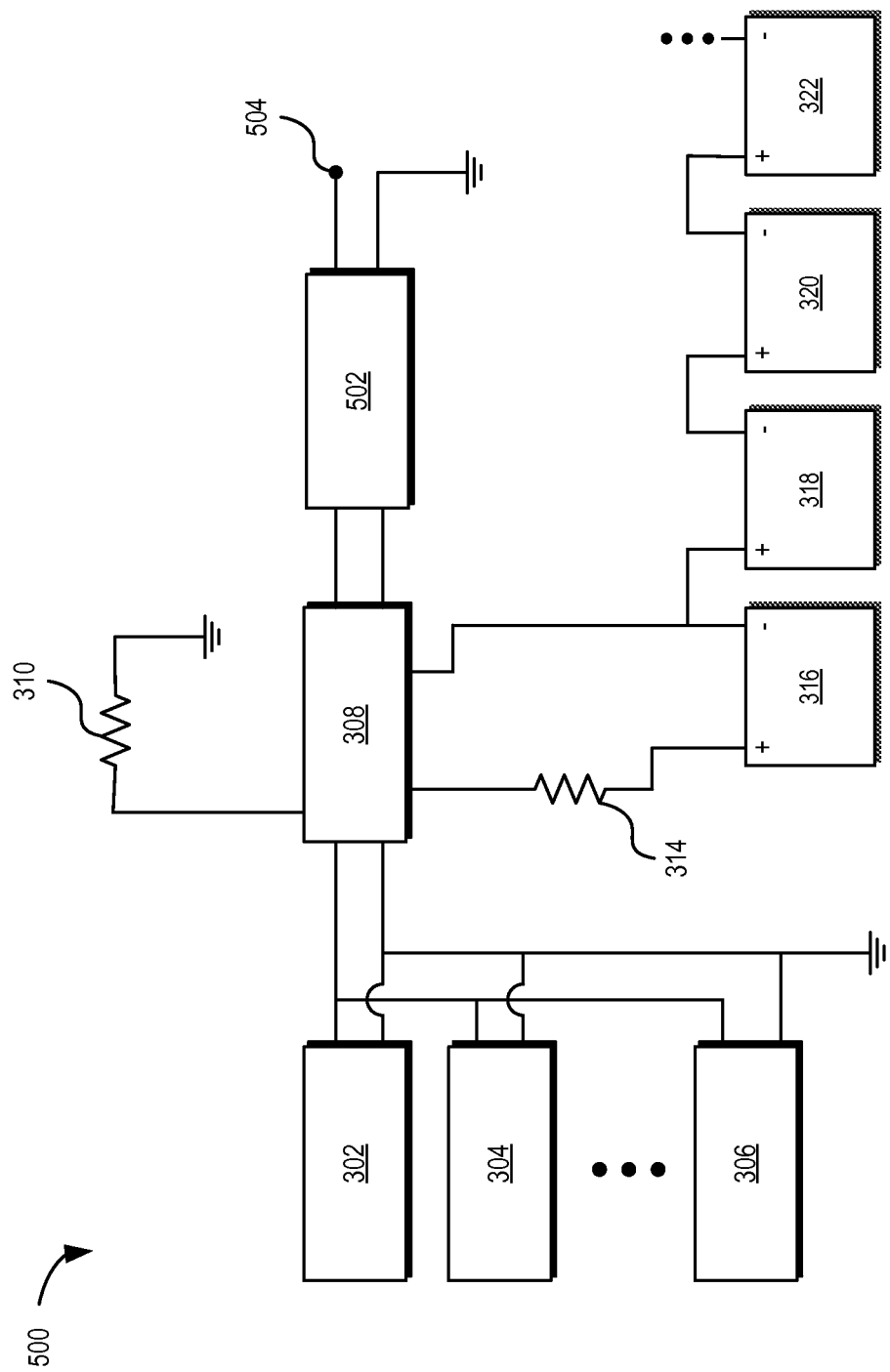
FIG. 5 illustrates a diagram of an exemplary system for measuring a pressure associated with a battery system including a counter consistent with embodiments disclosed herein.

FIG. 5 illustrates a diagram of an exemplary system 500 for measuring a pressure associated with a battery system including a counter 502 consistent with embodiments disclosed herein. Certain elements of the exemplary system 500 may be similar to those illustrated in and described in reference to FIGS. 3-4 and, accordingly, similar elements may be denoted with like numerals. In certain embodiments, outputs of the monostable multivibrator module 308 may be provided to a coupled counter module 502. For example, the pressure indication signal discussed above in reference to FIG. 3 may be provided to the counter module 502 as an input. In some embodiments, the counter module 502 may comprise a 4017 IC counter integrated circuit, although other suitable counters may also be utilized in connection with the disclosed embodiments.

The counter module 502 may generate a pressure indication count signal 504 providing an indication as to a number of times the pressure indication signal received from the monostable vibrator module 308 indicates a measured pressure crossing one or more set thresholds. For example, in embodiments where an asserted pressure indication signal output from the monostable vibrator module indicates a measured pressure exceeding a threshold, the counter module 502 may count a number of times the pressure indication signal is asserted. In this manner, the counter module 502 may be utilized in connection with determining a number of times a measured pressure crosses a threshold.

Figure 6:
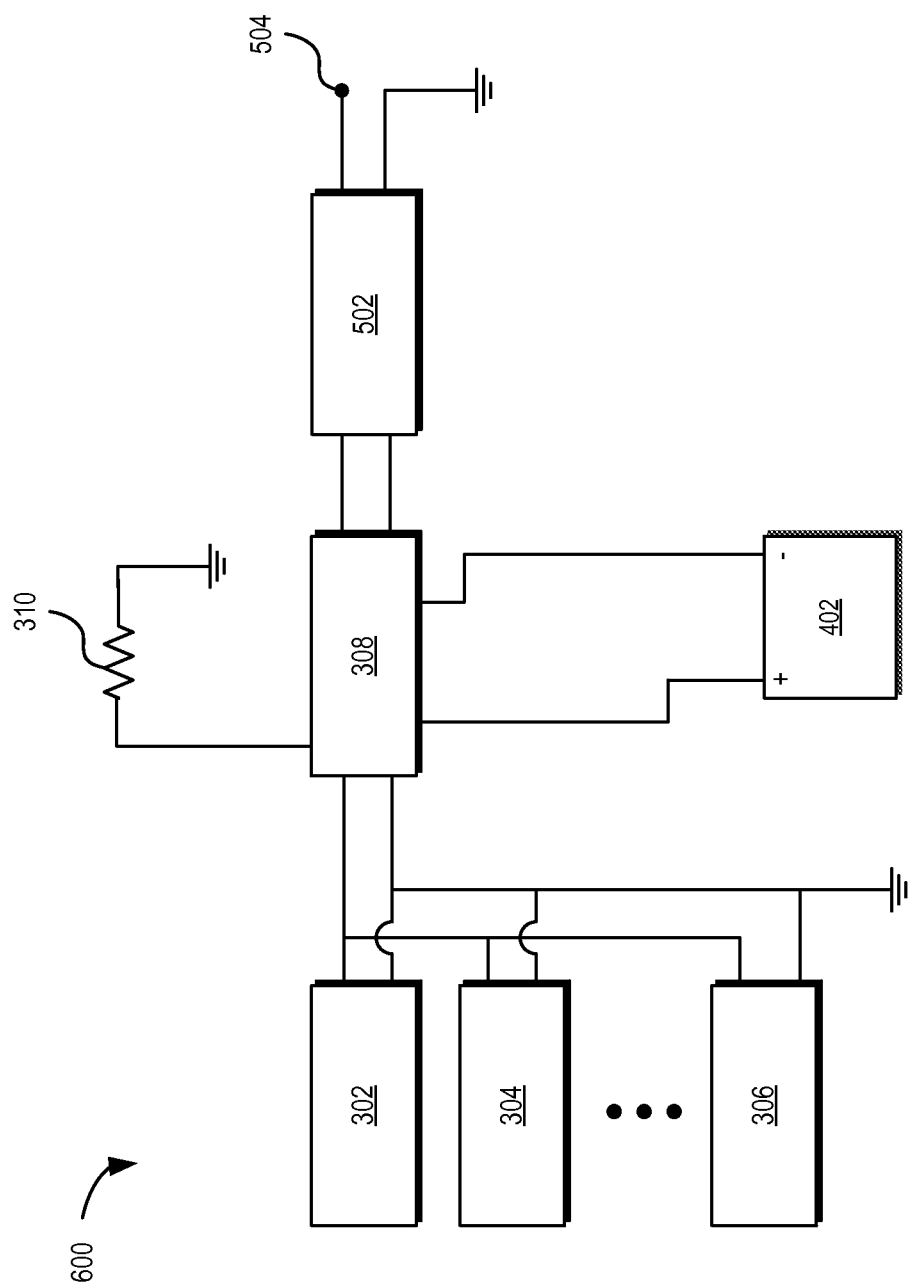
FIG. 6 illustrates a diagram of another exemplary system for measuring a pressure associated with a battery system including a counter consistent with embodiments disclosed herein.

FIG. 6 illustrates a diagram of another exemplary system 600 for measuring a pressure associated with a battery system including a counter 502 consistent with embodiments disclosed herein. Certain elements of the exemplary system 600 may be similar to those illustrated in and described in reference to FIGS. 3-5 and, accordingly, similar elements may be denoted with like numerals. Similar to the embodiments illustrated in connection with FIG. 4, in the illustrated system 600, the monostable multivibrator module 308 may be coupled to and/or powered by an external power source 402 (e.g., an external low voltage battery or the like). In further embodiments, the counter module 502 may also be coupled to and/or powered by the external power source 402.

Figure 7:
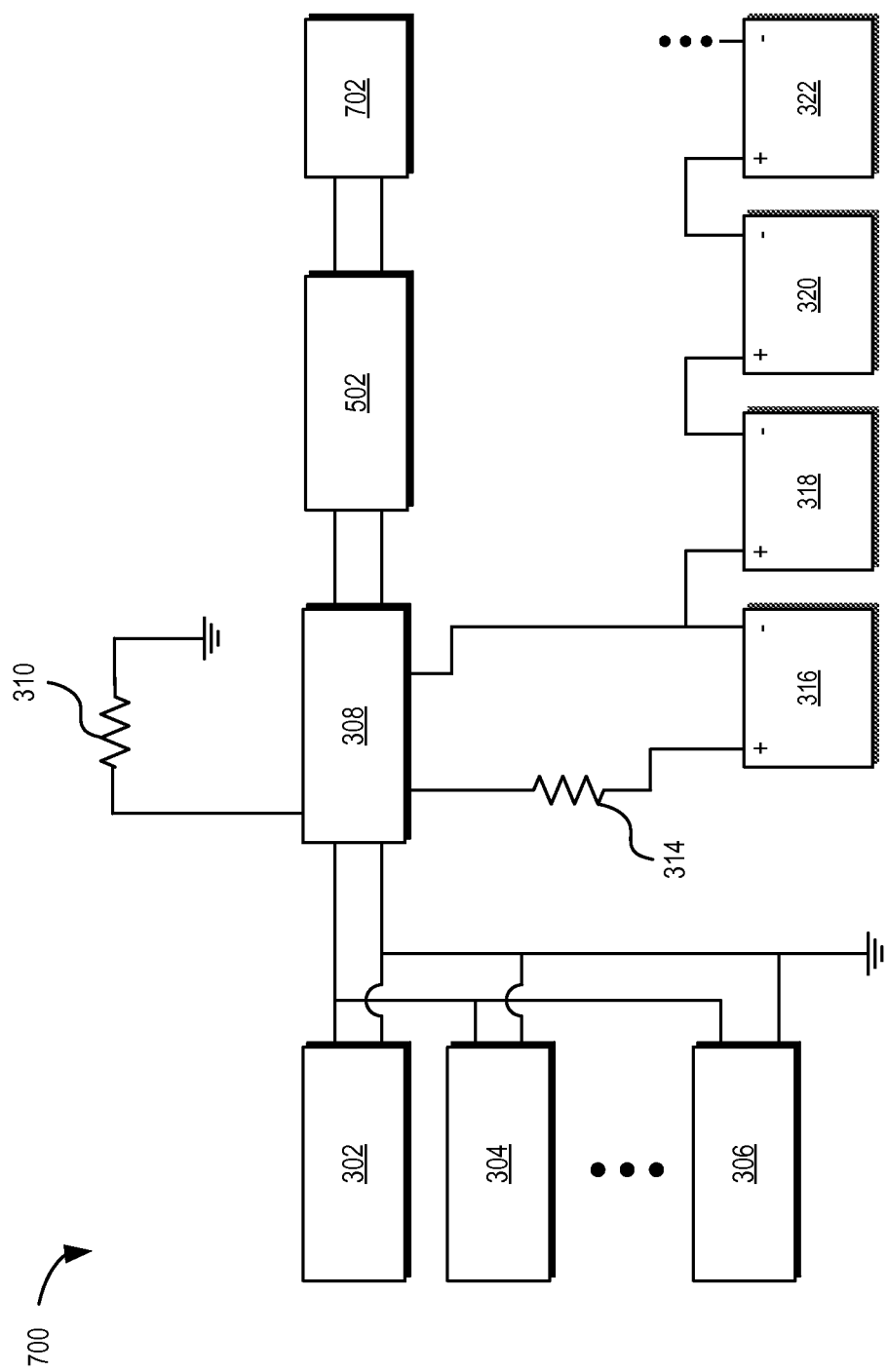
FIG. 7 illustrates a diagram of an exemplary system for measuring a pressure associated with a battery system including an alarm consistent with embodiments disclosed herein.

FIG. 7 illustrates a diagram of an exemplary system 700 for measuring a pressure associated with a battery system including an alarm module 700 consistent with embodiments disclosed herein. Certain elements of the exemplary system 700 may be similar to those illustrated in and described in reference to FIGS. 3-6 and, accordingly, similar elements may be denoted with like numerals. In certain embodiments, an output of the counter module 502 may be provided to a coupled alarm module 702. Based on the received counter module output, the alarm module 702 may output an alarm signal and/or provide an indication that a measured pressure has crossed a particular threshold (e.g., exceeded or fallen below the threshold or the like). In some embodiments, the alarm signal and/or indication may indicate that a measured pressure has crossed a particular threshold a particular number of times.

In some embodiments, the alarm module 702 may comprise an oscillator module. In certain embodiments, the oscillator module may comprise a Schmitt trigger-based relaxing oscillator. For example, the oscillator module may comprise a 4000 Series CMOS oscillator, although other suitable oscillators may also be utilized in connection with the disclosed embodiments. The oscillator module may be communicatively coupled to one or more alarm systems that may include, for example, an audio alarm system (e.g., a speaker), a visual alarm system (e.g., an indicator light), and/or any other suitable type of human and/or electronically-perceivable alarm system.

Figure 8:
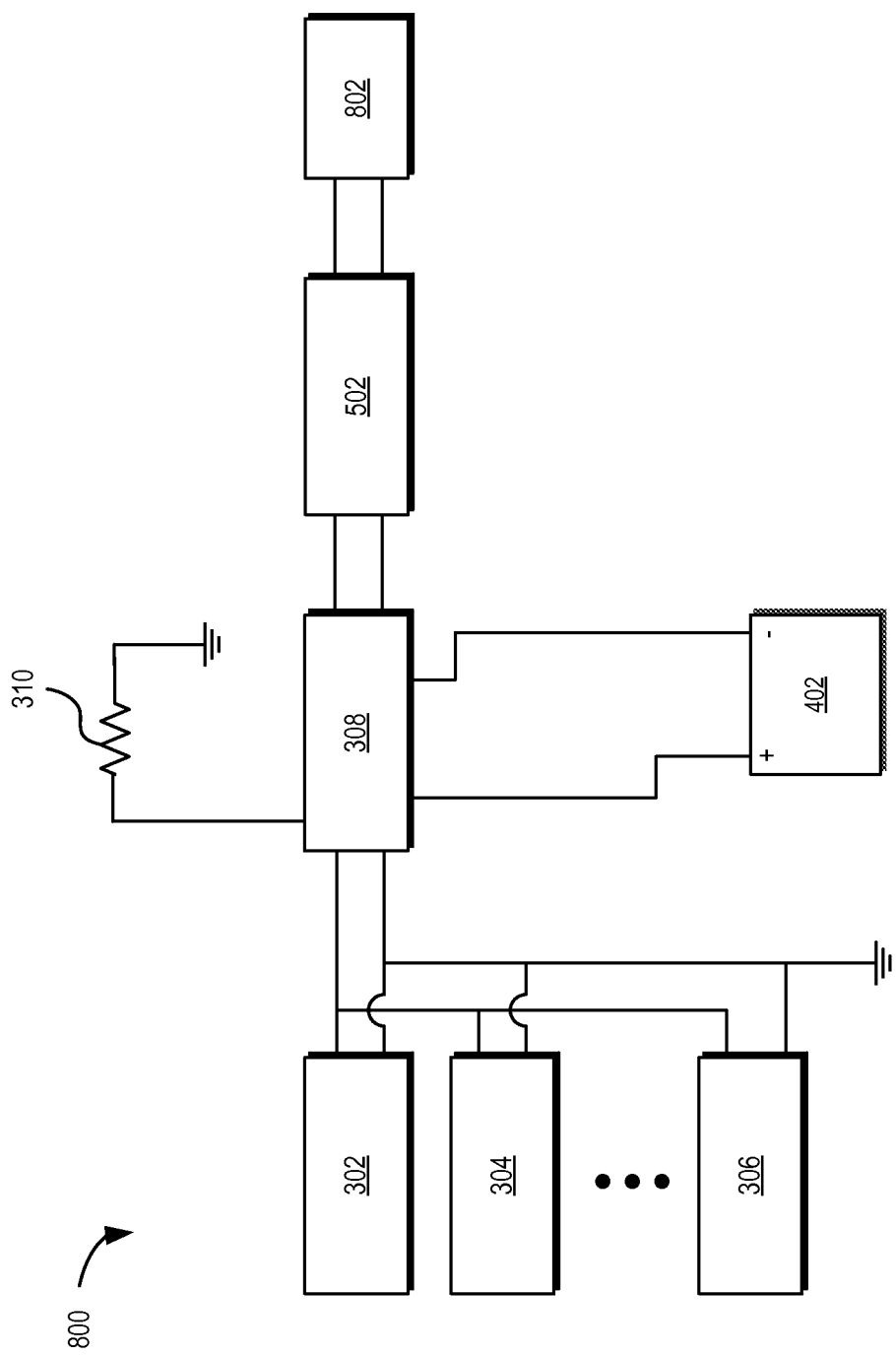
FIG. 8 illustrates a diagram of another exemplary system for measuring a pressure associated with a battery system including an alarm consistent with embodiments disclosed herein.

FIG. 8 illustrates a diagram of another exemplary system 800 for measuring a pressure associated with a battery system including an alarm module 702 consistent with embodiments disclosed herein. Certain elements of the exemplary system 800 may be similar to those illustrated in and described in reference to FIGS. 3-7 and, accordingly, similar elements may be denoted with like numerals. Similar to the embodiments illustrated in connection with FIG. 4 and FIG. 6, in the illustrated system 800, the monostable multivibrator module 308 may be coupled to and/or powered by an external power source 402 (e.g., an external low voltage battery or the like). In further embodiments, the counter module 502 and/or alarm module 702 may also be coupled to and/or powered by the external power source 402.

Figure 9:
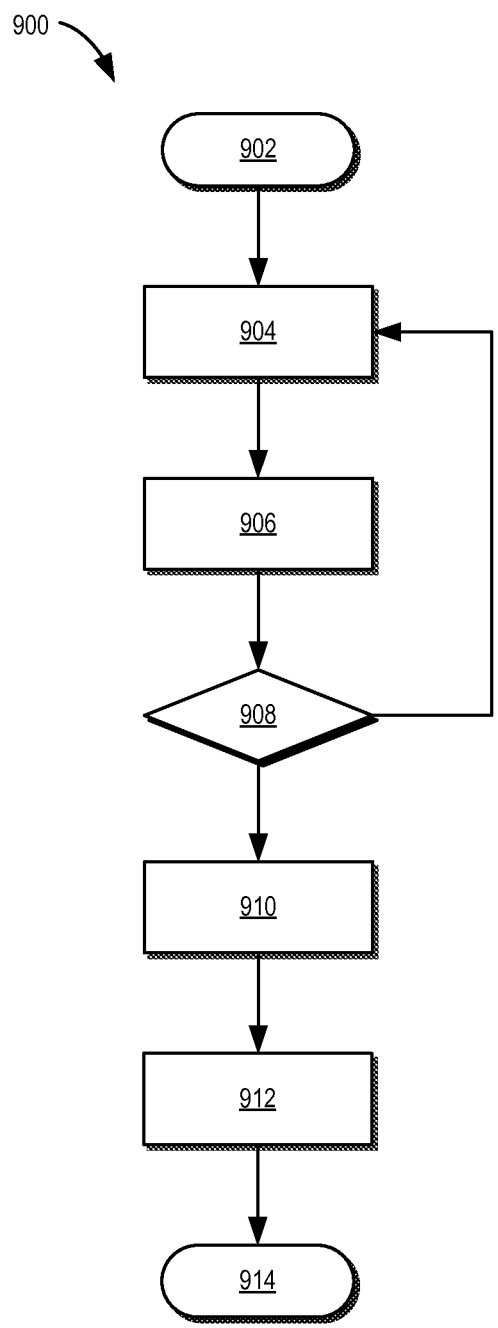
FIG. 9 illustrates a flow chart of an exemplary method for determining a state of a battery system consistent with embodiments disclosed herein.

FIG. 9 illustrates a flow chart of an exemplary method 900 for determining a state of a battery system consistent with embodiments disclosed herein. In certain embodiments, the illustrated method 900 may be performed using, at least in part, a pressure-sensitive material disposed proximate to a battery cell and/or other battery component (e.g., a pressure-sensitive smart foam) and/or a battery monitoring system and/or its constituent modules and/or components disclosed herein (e.g., a monostable multivibrator module, a counter module, an alarm module, etc.). In further embodiments, any other suitable system or systems may be utilized.

At 902, the method 900 may be initiated. In certain embodiments, the method 900 may be initiated upon startup of a vehicle and/or battery system, although other initiation times are also contemplated. In further embodiments, the method 900 may be initiated upon a vehicle system detecting a possible battery system condition and/or state that may have a predicted associated change in pressure exerted by a battery system component on an associated pressure-sensitive material implementing embodiments disclosed herein.

At 904, a voltage signal may be received from a pressure-sensitive material located proximate to a battery system component (e.g., a battery cell or the like). In certain embodiments, the pressure-sensitive material may comprise a smart foam material and may be integrated into a battery pouch configured to retain one or more cells and/or modules of a battery system. The received voltage signal may be related to and/or indicative of an amount of pressure applied to the pressure-sensitive material by the proximately located battery system component.

At 906, a comparison may be made between the received voltage signal and a threshold voltage signal. A determination may be performed at 908 as to whether the received voltage signal is less than or exceeds (i.e., dependent on a pressure condition of interest) the threshold voltage signal based on the results of the comparison performed at 906. For example, if the method 900 is used in connection with identifying a high pressure condition, the determination at 908 may determine whether the received voltage signal exceeds the threshold voltage signal based on the comparison at 906. Similarly, if the method 900 is used in connection with identifying a low pressure condition, the determination at 908 may determine whether the received voltage signal is less than the threshold voltage signal based on the comparison at 906. If the determination at 908 indicates a condition of interest has not occurred (e.g., a high or a low pressure condition), the method 900 may return to 904. Otherwise, the method 900 may proceed to 910.

At 910, a state of the battery system may be determined based on the determination at 908. For example, if the determination at 908 indicates that the received voltage signal exceeds a threshold voltage signal, a high pressure condition may be determined at 910. Similarly, if the determination at 908 indicates that the received voltage signal is less than a threshold voltage signal, a low pressure condition may be determined at 910. It will be appreciated that a variety of other suitable battery states and/or state information may be identified at 910 based on the determination at 908, on including, without limitation, battery EOL state information, battery venting information, battery loss of vacuum information, and/or the like.

At 912, at least one action may be implemented based on the state of the battery system determined at 910. In certain embodiments, the action may comprise a protective action and may include any of the exemplary protective actions disclosed herein. At 914, the method 900 may proceed to end.

Certain systems and methods disclosed herein may be implemented, at least in part, using one or more computer systems. For example, certain features and functionality of the charging system, the charging control system, and the control electronics may be implemented using a computer system. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. Certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system for determining a state of a battery system included in a vehicle comprising:
   a pouch configured to enclose a component of the battery system, the pouch comprising an integrated pressure-sensitive material located proximate to at least two sides of the enclosed component of the battery system, the pressure-sensitive material comprising a piezoelectric polyvinylidine film applied to at least one side of a substrate, the pressure-sensitive material being configured to generate a voltage signal indicative of a pressure applied to the pressure-sensitive material based on aged-based expansion of the battery system component, wherein the component of the battery system comprises a battery cell; and
   a battery monitoring system communicatively coupled to the pressure-sensitive material configured to:
      receive the voltage signal from the pressure-sensitive material
      compare the received voltage signal with a threshold voltage signal
      determine a state of the battery system based on a result of the comparison; and
      implement at least one action associated with the state in response to the determination.

2. The system of claim 1, wherein the received voltage signal is related to the pressure applied to the pressure-sensitive material based on a known relationship between an applied pressure and a generated voltage of the pressure-sensitive material, and wherein the threshold voltage is generated based, at least in part, on the known relationship.

3. The system of claim 1, wherein the state of the battery system comprises at least one of a low pressure condition, a high pressure condition, and an end-of-life condition.

4. The system of claim 1, wherein the at least one action comprises at least one of notifying a user of the vehicle of the state, venting the battery system, and disconnecting the battery system from a high-voltage bus.

5. The system of claim 1, wherein the substrate comprises a polyurethane substrate.

6. The system of claim 1, wherein the battery monitoring system comprises a monostable multivibrator module configured to perform the comparison between the received voltage signal and the threshold voltage signal.

7. The system of claim 6, wherein the battery monitoring system further comprises a counting module configured to receive a signal from the monostable multivibrator module indicating when the received voltage signal exceeds the threshold voltage signal and to generate a counting signal relating to a number of times the received voltage signal exceeds the threshold voltage signal used by the battery monitoring system in determining the state of the battery system.

8. The system of claim 1, wherein the battery monitoring system is configured to be internally powered by at least a portion of the battery system.

9. The system of claim 1, wherein the battery monitoring system is configured to be powered by a power source external to the battery system.

* * * * *